United States Patent [19]

Pentith et al.

[11] Patent Number: 4,667,592
[45] Date of Patent: May 26, 1987

[54] AGRICULTURAL BALER

[75] Inventors: Laurie A. Pentith, Ruther, nr. Tadcaster, Great Britain; Hermanus H. Vissers, Nieuw-Vennep; Jan Wondergem, Rijsenhout, both of Netherlands

[73] Assignee: Multinorm B.V., Nieuw-Vennep, Netherlands

[21] Appl. No.: 773,789

[22] Filed: Sep. 9, 1985

[30] Foreign Application Priority Data

Sep. 14, 1984 [GB] United Kingdom ............. 8423231

[51] Int. Cl.⁴ ................................................. B30B 5/06
[52] U.S. Cl. .......................................... 100/88; 100/77; 56/341
[58] Field of Search ................... 100/77, 88, 5, 13; 56/341

[56] References Cited

U.S. PATENT DOCUMENTS

| 4,009,559 | 3/1977 | Mast | 100/88 X |
| 4,062,172 | 12/1977 | Rice | 100/77 X |
| 4,499,714 | 2/1985 | Hollmann | 100/88 |
| 4,534,285 | 8/1985 | Underhill | 100/88 |

FOREIGN PATENT DOCUMENTS

| 0064117 | 11/1982 | European Pat. Off. | 56/341 |
| 0064116 | 11/1982 | European Pat. Off. | 56/341 |
| 0149368 | 7/1985 | European Pat. Off. | 100/88 |
| 2219976 | 11/1973 | Fed. Rep. of Germany . | |
| 2634638 | 2/1978 | Fed. Rep. of Germany . | |
| 2368214 | 5/1978 | France . | |
| 8402253 | 6/1984 | World Int. Prop O. . | |

Primary Examiner—Billy J. Wilhite
Attorney, Agent, or Firm—John P. Snyder

[57] ABSTRACT

Figure 5:
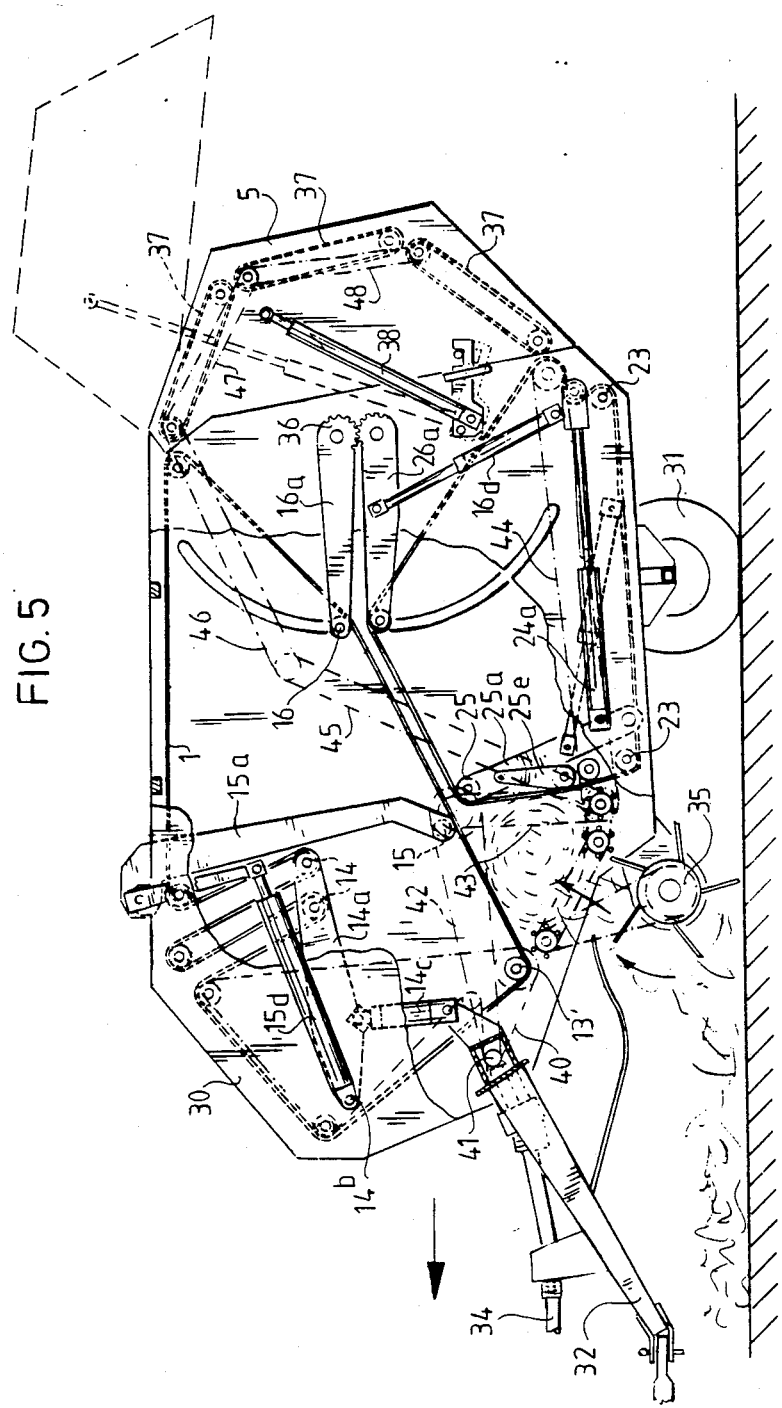

A so-called round baler has baling and wrapping chambers (3, 4), defined in part by flexible endless belts (1, 2). A bale formed in the chamber (3) may be transferred to the chamber (4) after separating the juxtaposed portions (12, 22) of working runs of the belt (FIG. 5).

20 Claims, 6 Drawing Figures

AGRICULTURAL BALER

During the operation of the known types of the so-called round baler, crop is fed continuously into a baling chamber to form a cylindrical bale as the baler is driven across the field. When the bale has reached a predetermined size, the crop feed is interrupted by bringing the baler to a halt, and the bales wrapped with twine, or netting, for example. The wrapped bale is then allowed to fall to the field and the baler restarted. Although the bale is formed very quickly, the baler is stationary for approximately one-third of its operating time.

The baler proposed herein operates more efficiently than the known types of baler because crop feed may be continued even while the formed bale is being wrapped, and it is therefore unnecessary to halt the baler during wrapping of the bale.

Figure 1:
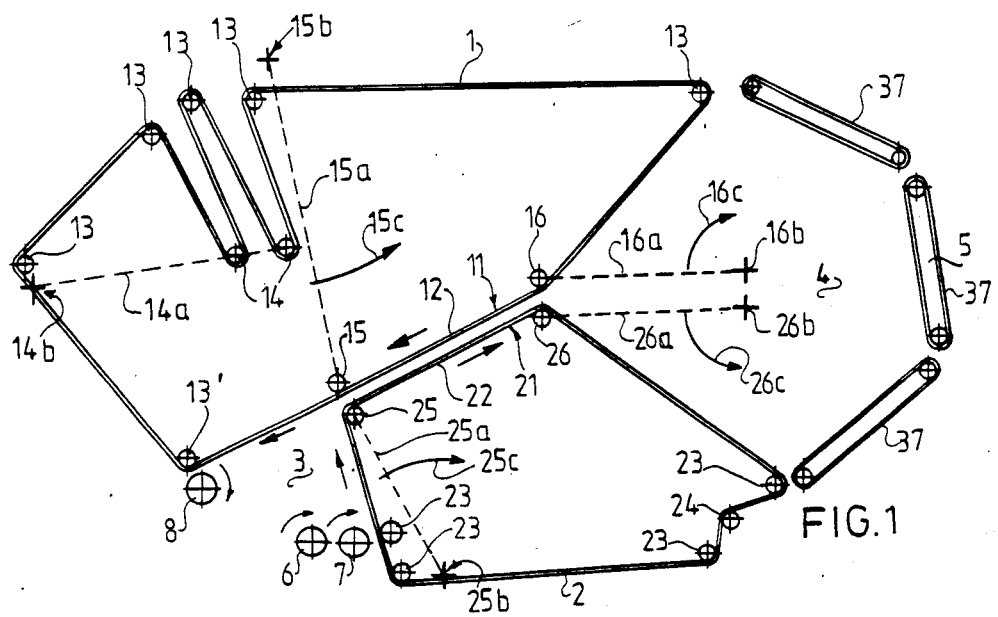
Figure 2:
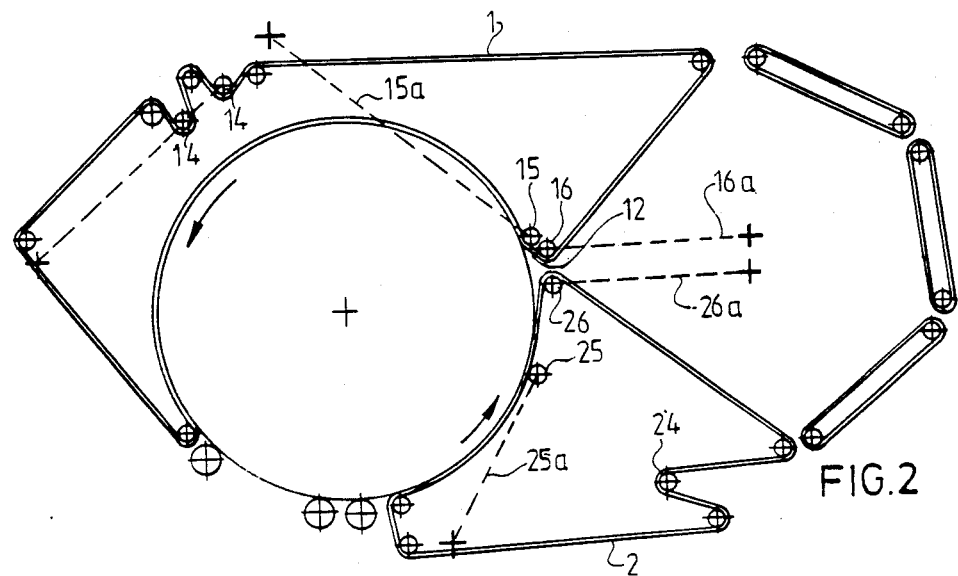
Figure 3:
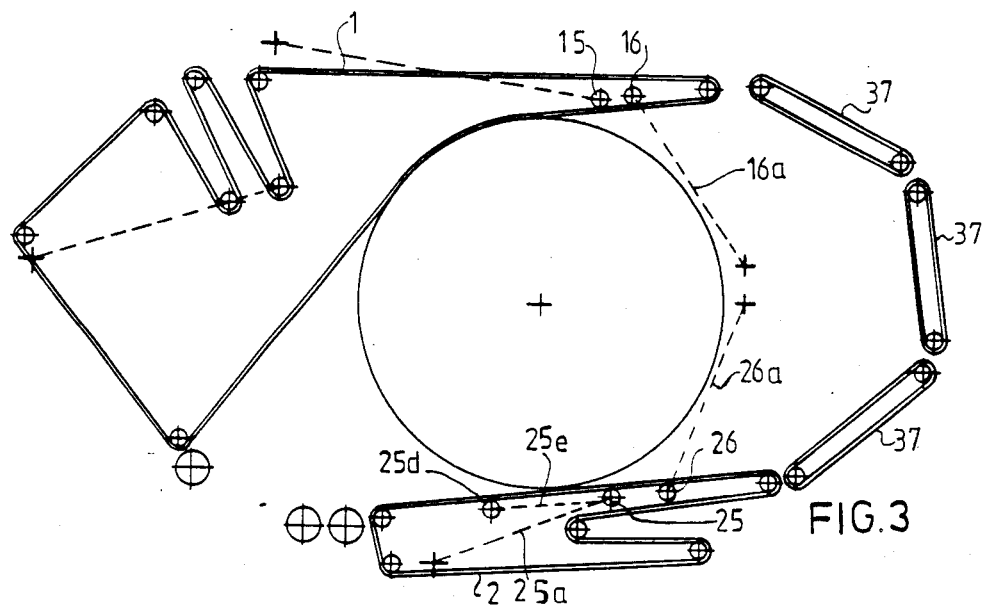
Figure 4:
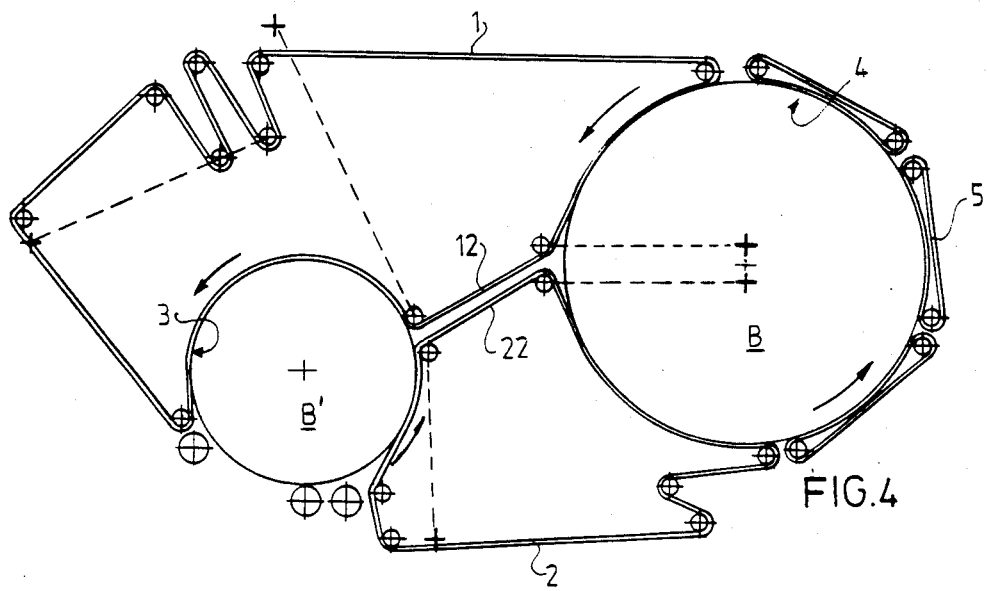
Figure 6:
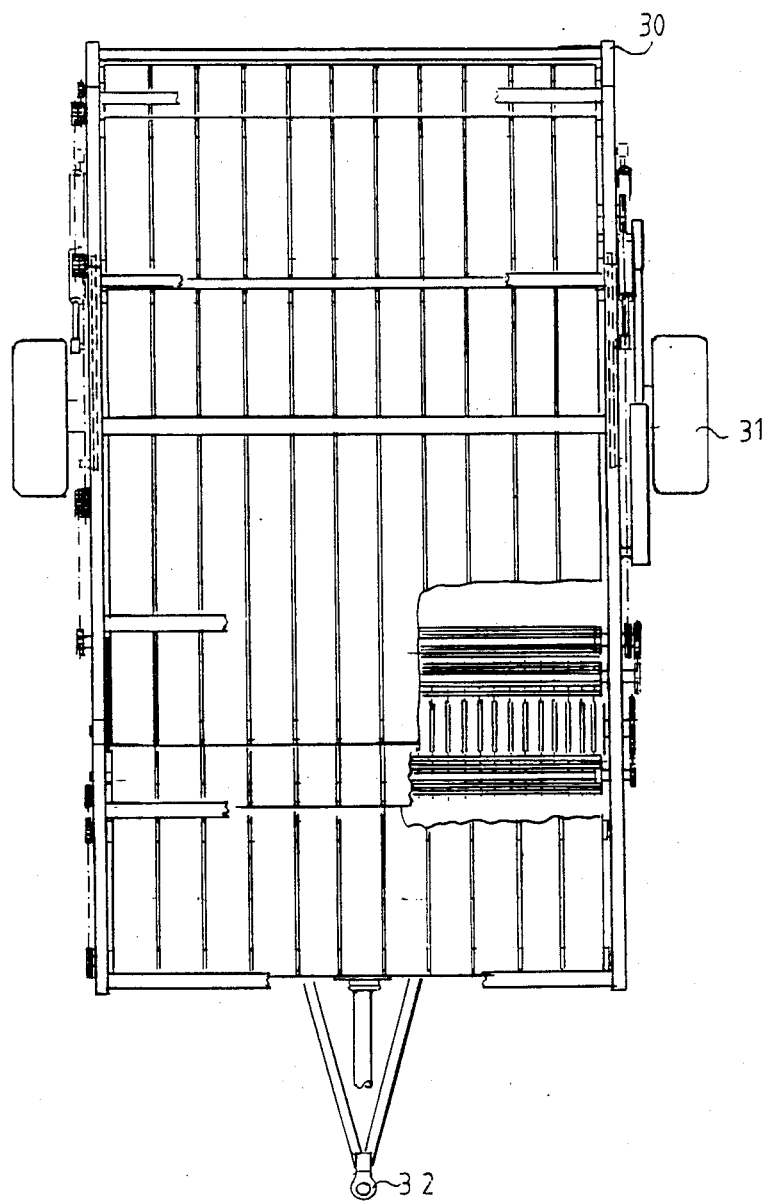

In the drawings:

FIG. 1 is a schematic side elevation of the main operating components of the proposed baler, the baler being in its inoperative condition, FIG. 2 is a view similar to FIG. 1, but showing a bale which has been almost completely formed in a baling chamber, FIG. 3 shows the bale being transferred to a wrapping chamber and, FIG. 4 shows the bale being wrapped while a second bale is being formed, FIG. 5 is a side elevational view of a baler provided with the belt system of FIG. 1 including a driving system, FIG. 6 is a top view of the baler in FIG. 5.

The proposed baler includes a frame 30 which is supported on running wheels 31 and provided with couplings 32 to enable the baler to be drawn behind an agricultural tractor and operated from the power-take-off 34 of the tractor. The baler also has a rotary, tined drum 35 for picking up crop from the field and feeding it into the baler. All of the foregoing components are conventional and none of them is shown in the drawings 1-4, except for FIG. 5 and FIG. 6. The frame of the baler defines a cavity in which upper and lower belts 1 and 2 are supported and guided. It will be understood that the belts may be replaced by endless, deformable traction elements of any suitable type, for example parallel chains. The upper belt 1 is trained around a set of rollers 13 arranged to rotate about fixed axes supported in the side walls of the frame 30. At least one, 13', of the rollers 13 constitutes a driving roller for causing the belt 1 to circulate in the direction of the arrow. The drive connection, here a chain 40 from the main transmission box 41 to the driving roller 13' or rollers includes a clutch or hydraulic motor which may be disengaged in order to halt the belt, or at least significantly reduce its speed. Instead of a clutch, the drive may include a mechanism which is operable to drive the belt 1 in reverse. The tension in the belt 1 is maintained by rollers 14 carried on a pair of arms 14a disposed one at each side of the belt and pivoting about an axis 14b. The arms 14a may be suitably weighted or biased by springs or hydraulic rams 14c, as shown. Bearing on a working run 11 of the belt 1 are two longitudinally spaced rollers 15 and 16 supported on respective pairs of arms 15a and 16a, pivotable about axes 15b and 16b, respectively in the directions of the arrows 15c, 16c under the action of pneumatic or hydraulic rams, 15d and 16d respectively, as shown.

The belt 2 is similarly trained around rollers 23 having fixed axes of rotation, being supported in the frame 30. Said belt 2 is tensioned by a roller 24 movable by a mechanism, for instance hydraulic ram 24a, as shown in FIG. 5. A pair of arms 25a pivotable about an axis 25b support a roller 25 having a normal position adjacent the roller 15, and a pair of arms 26a pivotable about an axis 26b support a roller 26 having a normal position adjacent the roller 16. The rollers 25 and 26 bear on a working run 21 of the belt 2. Lengths of the working runs 11 and 21 which extend between the rollers 15, 16 and 25 and 26 are indicated at 12 and 22, and in the inoperative condition of the baler are substantially parallel and narrowly spaced. Said ram 16d also acts on the arms 25a for the purpose of swinging the roller 25 in the direction 25c, and as said on the arms 26a for the purpose of swinging the roller 26 in the direction of the arrow 26c. The shafts, located near the center line of the wrapping chamber, on which the arms 16a and 26a are mounted, or the arms themselves, are provided with intermeshing pinions 36 to synchronise the movement of the arms. The belt 2 is normally driven by chain transmission 42, 43, 44 in the direction of the arrow by one or more of the rollers 23 but without the interposition of a clutch as described for the belt 1.

The normal position of the rollers 15, 25, and 16, 26 are as shown in FIG. 1, and cause the working runs 11, 21 of the belts to define variable volume baling and wrapping chambers 3 and 4. respectively at the forward and rearward ends of the baler. A tail gate 5 equipped with belts or rollers 37 closes the rear side of the chamber 4 and may be raised in a known manner by hydraulic ram 38. Said belts 37 are driven by chain drive 45, 46, 47, 48. The chamber 3 is provided with a group of main support rollers 6, 7 and 8.

Continuing to refer to FIG. 1, during progress of the baler along a windrow, the crop is lifted by the tined drum into the chamber 3, across the upper surfaces of the rollers 6 and 7, into contact first with the belt 2 and thereafter the belt 1 and roller 8. Contact with these moving surfaces causes the stream of crop to form the core of a cylindrical bale, which increases in diameter as further crop enters the chamber. The increase in the size of the bale is accomodated by movement of the rollers 15 and 25 carried on the arms 15a and 25a. The rollers 14 and 24 also adjust in position to maintain tension in the belts 1 and 2 constant.

FIG. 2 shows the situation when the bale indicated at B has increased in size to approximately 85-95 per cent of its desired diameter, and is continuing to increase in size. At a predetermined partial diameter of this order, the rams associated with arms 16a and 26a are operated to swing the rollers 16 and 26 into retracted positions shown in FIG. 3. The arms 25a are also pulled down to lower the roller 25 into a position adjacent the roller 26. As shown in FIG. 3, a secondary roller 25d may be carried on arms 25e which are pivoted to the arms 25a, so as to occupy a position in line with the rollers 26 and 25 when the latter are positioned as shown in this figure. The roller 15 is also brought into a position adjacent roller 16. The result is to spread apart the intermediate lengths 12 and 22 of the working runs of the belts and cause the two chambers 3 and 4 to intercommunicate.

The clutch or mechanism through which the belt 1 is driven is now operated to halt the belt or drive it in reverse. The belt 2 now operates as a conveyor to transport the bale towards the rear of the machine and into contact with the tail gate belts 37, as shown in FIG. 4.

During the transportation of the bale and its reception in the wrapping chamber, crop continues to be fed to it along the belt 2, and the diameter of the bale continues to increase.

When the bale B is in position against the tail gate 5, see FIG. 4, rollers 15, 16 and 25, 26 return to their original positions, separating the chambers and restoring the baling chamber 3 to its initial size. Belt 1 is re-started. Crop within the chamber 3 at this moment is deflected by the return of the belts and begins to form a second bale, B' in FIG. 4. The belts 1 and 2 now serve to rotate the bale B in the wrapping chamber 4, as well as the newly forming bale B', and a wrapping device of known type is brought into operation to wrap the bale B which is subsequently jettisoned by raising the tail gate.

The baler continues to travel along the windrow and take up crop throughout the transfer operation. The wrapped bale may be released automatically following wrapping although the control mechanism may be over-rideen by the operator if it is desired to retain the bale until a more suitable location is reached. The other operations performed by the baler, including transfer from chamber 3 to chamber 4 take place fully automatically in response to the size and position of the bale.

The functions of either or each of the illustrated belts 1 and 2 may be performed by two or more belts, and it is within the scope of the invention for an intermediate chamber to be formed between the chambers 3 and 4. One or more of the rollers shown in the drawings may be replaced by other forms of rotary or non-rotary guides over which the traction elements slide. Instead of being drawn behind a tractor, and powered therefrom, the proposed baler may be self-propelled or incorporated in other crop processing machinery. Conceivably, the present proposal may be applied to stationary equipment to which material to be baled is fed continuously.

What is claimed is:

1. A crop baling device comprising the combination of a frame, first and second endless flexible means presenting forwardly located convergent flight portions for defining a baling chamber having an entrance mouth tapering to a substantially closed discharge mouth and rearwardly located divergent flight portions for defining part of a bale-wrapping chamber having a substantially closed entrance mouth diverging rearwardly, swingable means for normally closing the bale-wrapping chamber opposite the entrance mouth thereof and movable to open position to allow discharge of a wrapped bale from the bale-wrapping chamber, means for feeding crop continuously to said entrance mouth of the baling chamber, means for driving said endless flexible means in relatively opposite directions so that crop is rotated within the baling chamber to form a bale which grows in size and so that a formed and grown bale transferred to the bale-wrapping chamber is also rotated therewithin, first guide means for retreating said substantially closed discharge mouth of the baling chamber away from the entrance mouth of the baling chamber and toward the entrance mouth of the bale-wrapping chamber to elongate the baling chamber while the forwardly located flight portions radially expand to accommodate a growing bale, and second guide means for swinging the convergent flight portions apart to expel a grown bale from the baling chamber while crop is being fed thereto and for re-establishing said substantially closed discharge mouth and returning same toward the entrance mouth of the baling chamber and away from the entrance mouth of the bale-wrapping chamber to terminate feed of crop to the transferred bale and commence the formation of a new bale in the baling chamber.

2. A crop baling device as defined in claim 1 wherein said second guide means simultaneously swings the convergent and divergent flight portions apart to transfer the grown bale directly from the baling chamber into the bale-wrapping chamber.

3. A crop baling device as defined in claim 2 wherein the substantially closed discharge mouth of the baling chamber is initially spaced forwardly of the substantially closed entrance mouth of the bale-wrapping chamber and said second guide means is operated when the substantially closed discharge mouth of the baling chamber is substantially at the substantially closed entrance mouth of the bale-wrapping chamber.

4. A crop baling device as defined in claim 3 wherein each said first and second endless flexible means is a single endless member.

5. A crop baling device as defined in claim 1 including third guide means for swinging those portions of the first and second endless flexible means which define the entrance mouth of the bale-wrapping chamber apart to admit a growing bale into the balewrapping chamber and for thereafter closing said substantially closed entrance mouth.

6. A crop baling device as defined in claim 2 wherein said second and third guide means operate in synchronism to transfer a growing bale directly from the baling chamber into the bale-wrapping chamber.

7. A crop baling comprising the combination of a frame, first endless flexible means mounted on said frame and having a first flight portion defining part of a baling chamber, the first flight portion having an entrance mouth end and a discharge end, second endless flexible means mounted on said frame having a first flight portion defining part of said baling chamber, the first flight portion of the second endless flexible means having an entrance mouth end spaced from the entrance mouth end of the first flight portion of the first endless flexible means to define an entrance mouth therewith and a discharge end normally disposed in proximity to the discharge end of the first flight portion of the first endless flexible means to close the baling chamber at such discharge ends, means for feeding crop continuously to the entrance mouth, drive means for traveling said first endless flexible means in a direction causing the first flight portion thereof to travel from said discharge end toward said entrance mouth end and for traveling said second endless flexible means in a direction opposite to that of said first flight portion of the first endless flexible means so that the two first flight portions cooperate to rotate crop in the baling chamber to commence the formation of a bale and cause it to grow in size, guide means for retreating the discharge ends away from the entrance mouth ends as the formed bale grows in size, further guide means for spreading the discharge ends of the two first flight portions apart to allow discharge of the growing bale from the baling chamber while continuing the feed of crop thereto when the discharge ends of the first flight portions have been retreated away from the entrance mouth ends corresponding to a predetermined size of the growing bale in the baling chamber and for returning the discharge ends of the two first flight portions toward the entrance mouth ends and into said proximity after the growing bale has left the baling chamber so as to terminate feeding of crop to the transferred bale and commence the formation of a further bale in the baling chamber, and means for discharging the transferred bale from the device after the further bale has been commenced.

8. A crop baling device as defined in claim 7 wherein said first and second endless flexible means each include second flight portions defining part of a bale-wrapping chamber, said further guide means transferring a grown bale directly from the baling chamber into the bale-wrapping chamber.

9. A crop baling device as defined in claim 8 wherein the discharge end of the baling chamber is initially spaced from the bale-wrapping chamber and said further guide means is operated when the discharge ends are substantially at the bale-wrapping chamber.

10. A crop baling device as defined in claim 9 wherein each said first and second endless flexible means is a single endless member.

11. A crop baling device as defined in claim 7 wherein second flight portions of the first and second endless flexible means define part of a bale-wrapping chamber and including third guide means for swinging those portions of the first and second endless flexible means which define part of the bale-wrapping chamber apart to admit a growing bale into the bale-wrapping chamber.

12. A crop baling device as defined in claim 11 wherein said further and third guide means operate in synchronism to transfer a growing bale directly from the baling chamber into the bale-wrapping chamber.

13. A crop baling device comprising the combination of a frame, a first endless flexible member mounted on said frame and having a first flight portion defining part of a first baling chamber, and a second flight portion leading into the first flight portion and defining a part of a bale-wrapping chamber, the first flight portion having an entrance mouth end and a discharge end, first drive means for traveling said first endless flexible member in a direction causing the first flight portion thereof to travel from said discharge end toward said entrance mouth end to form a bale of growing size in said first baling chamber, a second endless flexible member mounted on said frame having a first flight portion defining part of said first baling chamber, and a second flight portion extending from said first flight portion of the second endless flexible member and defining part of said bale-wrapping chamber, the first flight portion of the second endless flexible member having an entrance mouth end spaced from the entrance mouth end of the first flight portion of the first endless flexible member to define an entrance mouth therewith and a discharge end normally disposed in proximity to the discharge end of the first endless flexible member, means for feeding crop continuously to the entrance mouth, second drive means for traveling said second endless flexible member in a direction opposite to that of said first flight portion of the first endless flexible member so that the two first flight portions cooperate to rotate a growing bale being formed in said first baling chamber, first guide means for increasing the length of said first flight portion of the first endless flexible member as the bale being formed grows in size, second guide means for increasing the length of the first flight portion of the second endless flexible member as the bale being formed grows in size, third guide means for spreading the discharge ends of the two first flight portions to allow discharge of the growing bale from the first baling chamber toward the bale-wrapping chamber and for returning the discharge ends of the two first flight portions into said proximity when the growing bale has left the first baling chamber, means for altering the relative speeds of the opposite directions of travel of the first and second endless flexible members when the discharge ends of the two flight portions are spread so as to cause the growing bale to be displaced from the first baling chamber while the feed of crop continues to the growing bale being transferred and for re-establishing the normal drive relation of the two endless flexible members when the discharge ends are returned into proximity so that the two first flight portions commence the formation and rotation of a further bale of growing size in the first baling chamber, and means for discharging the transferred bale from the device after commencement of the further bale.

14. A crop baling device as defined in claim 13 wherein said third guide means operates in conjunction with the first and second guide means to transfer the grown bale directly from the baling chamber into the bale-wrapping chamber.

15. A crop baling device as defined in claim 14 wherein the discharge ends of the baling chamber are initially spaced from the bale-wrapping chamber and said third guide means is operated when the discharge ends of the baling chamber are substantially at the bale-wrapping chamber.

16. A crop baling device as defined in claim 15 wherein each said first and second endless flexible means is a single endless member.

17. A crop baling device as defined in claim 16 wherein said first, second and third guide means each include a swing arm and means for coordinating the movements of the swing arms.

18. A crop baling device as defined in claim 17 wherein the swing arm of the first guide means is centered above the baling chamber, the swing arm of the second guide means is centered below the baling chamber and the third guide means includes two swing arms centered near the center of the bale-wrapping chamber.

19. A crop baling device as defined in claim 18 wherein said first drive means includes a clutch operated when the third guide means is operated to interrupt drive to the first endless flexible member.

20. A crop baling device as defined in claim 18 wherein said first drive means includes a reversible motor operated to reverse the direction of drive of the first endless flexible member when the third guide means is operated.

* * * * *